(12) United States Patent
Liu et al.

(10) Patent No.: US 11,455,222 B2
(45) Date of Patent: Sep. 27, 2022

(54) SYSTEMS AND METHODS FOR TESTING MANY-CORE PROCESSORS

(71) Applicant: ALIBABA GROUP HOLDING LIMITED, Grand Cayman (KY)

(72) Inventors: Chunsheng Meon Liu, San Mateo, CA (US); Arjun Chaudhuri, San Mateo, CA (US); Zhibin Xiao, San Mateo, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 129 days.

(21) Appl. No.: 16/834,320

(22) Filed: Mar. 30, 2020

(65) Prior Publication Data

US 2021/0303426 A1    Sep. 30, 2021

(51) Int. Cl.
*G06F 11/22* (2006.01)
(52) U.S. Cl.
CPC ................. *G06F 11/2242* (2013.01)
(58) Field of Classification Search
CPC ........ G06F 11/2242; G01R 31/318536; G01R 31/318544; G01R 31/318563; G01R 31/318569
USPC ............................ 714/30, 31, 724, 726, 729
See application file for complete search history.

(56) References Cited

U.S. PATENT DOCUMENTS

| 7,949,920 B2 * | 5/2011 | Devanathan ... G01R 31/318575 714/729 |
| 9,244,124 B2 * | 1/2016 | Alvarez-Icaza Rivera ................. G01R 31/318519 |
| 9,404,969 B1 * | 8/2016 | Keller ............ G01R 31/318547 |

* cited by examiner

*Primary Examiner* — Joseph R Kudirka
(74) *Attorney, Agent, or Firm* — Finnegan, Henderson, Farabow, Garrett & Dunner, LLP

(57) ABSTRACT

Systems and methods are provided for testing many-core processors consisting of processing element cores. The systems and methods can include grouping the processing elements according to the dataflow of the many-core processor. Each group can include a processing element that only receives inputs from other processing elements in the group. After grouping the processing elements, test information can be provided in parallel to each group. The test information can be configured to ensure a desired degree of test coverage for the processing element that that only receives inputs from other processing elements in the group. Each group can perform testing operations in parallel to generate test results. The test results can be read out of each group. The processing elements can then be regrouped according to the dataflow of the many-core processor and the testing can be repeated to achieve a target test coverage.

28 Claims, 9 Drawing Sheets

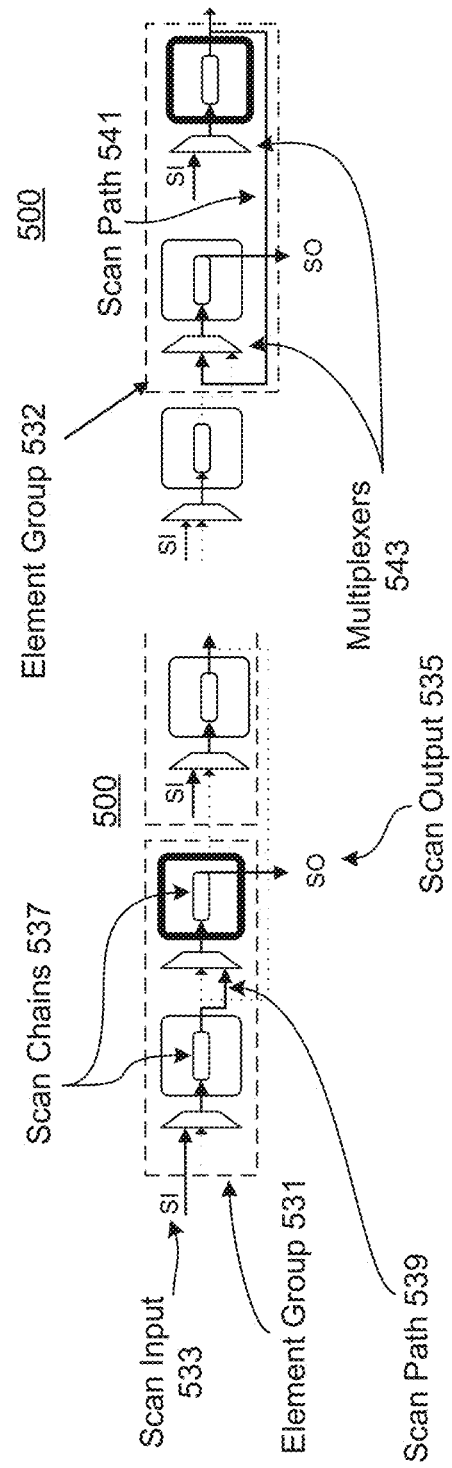

SYSTEMS AND METHODS FOR TESTING MANY-CORE PROCESSORS

BACKGROUND

Computer processors are often tested before use, to reduce the risk of unintended design or manufacturing defects that might cause them to behave in unexpected or undesirable ways. Such testing may use software and equipment designed to automatically test the computer processor. The computer processor can also be designed with built-in structures that facilitate testing. Automatic test pattern generation software can generate the test data for testing the computer processor. Using the test equipment and the built-in structures, a computer processor under test can receive the test data, process the test data into test results, and provide the test results for analysis. The test data can be selected to test whether one or more logical or physical elements of the computer processor is operating correctly. A computer processor can include many such logical or physical elements. The "test coverage" of a suite of test data can be a measure of the number of such elements tested by the test data in the suite. For example, such test coverage can be expressed as an absolute number of tested elements or as a percentage of potentially testable elements actually tested by the suite of test data. The degree of test coverage achievable by a test pattern can vary, with more extensive testing generally providing a higher degree of coverage and a concomitant increase in the expected reliability of successfully tested computer processors.

SUMMARY

Embodiments of the present disclosure provide systems and methods for dataflow-aware testing of many-core processors.

The disclosed embodiments include a processor. The processor includes processing elements. The processing elements can be configured to process data according to a first dataflow. The processing elements can further be configured to be grouped into first groups of the processing elements. Each of the first groups can include a first dependent processing element and a provider processing element. The first dependent processing element can be configured to depend on output from the provider processing element according to the first dataflow. First dependent processing elements of the first groups of the processing elements can be configured for testing in parallel.

The disclosed embodiments further included a method for testing a processor including processing elements configurable to process data according to a first dataflow. The method can include operations. The operations can include providing test data to the processor. The test data can include configuration information and test information. The configuration information can group the processing elements into first groups, each one of the first groups including a first dependent processing element and a provider processing element. The first dependent processing element can be configured to depend on output from the provider processing element according to the first dataflow. The test information can at least partially determine a state of the each one of the first groups. The first groups can be tested in parallel to determine statuses of the first dependent processing elements.

The disclosed embodiments further include a non-transitory computer-readable medium. The comprising a set of instructions that are executable by a testing system to cause the testing system to perform operations for testing a processor including processing elements configurable to process data according to a first dataflow, the operations comprising: providing test data for testing first dependent processing, the test data including configuration instructions for grouping the processing elements into first groups, each of the first groups including a first dependent processing element and a provider processing element, the first dependent processing element configured to depend on output from the provider processing element according to the first dataflow, and test information for configuring the processing elements of the first groups; and testing the first groups to determine statuses of the first dependent processing elements.

The disclosed embodiments further include a system. The system includes a test system and a chip communication system. The chip communication system includes processing elements configurable by the test system to perform operations. The operations include processing data according to a first dataflow. The processing elements can be grouped into first groups of the processing elements, each of the first groups including a first dependent processing element and a provider processing element. The first dependent processing element can be configured to depend on output from the provider processing element according to the first dataflow. First dependent processing elements of the first groups of the processing elements can be configured for testing in parallel.

Additional features and advantages of the disclosed embodiments will be set forth in part in the following description, and in part will be apparent from the description, or may be learned by practice of the embodiments. The features and advantages of the disclosed embodiments may be realized and attained by the elements and combinations set forth in the claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which comprise a part of this specification, illustrate several embodiments and, together with the description, serve to explain the principles and features of the disclosed embodiments. In the drawings:

FIGS. 5C and 5D depict exemplary schematics of a testing architecture for grouped processing elements, in accordance with some embodiments of the present disclosure.

DETAILED DESCRIPTION

Figure 1:
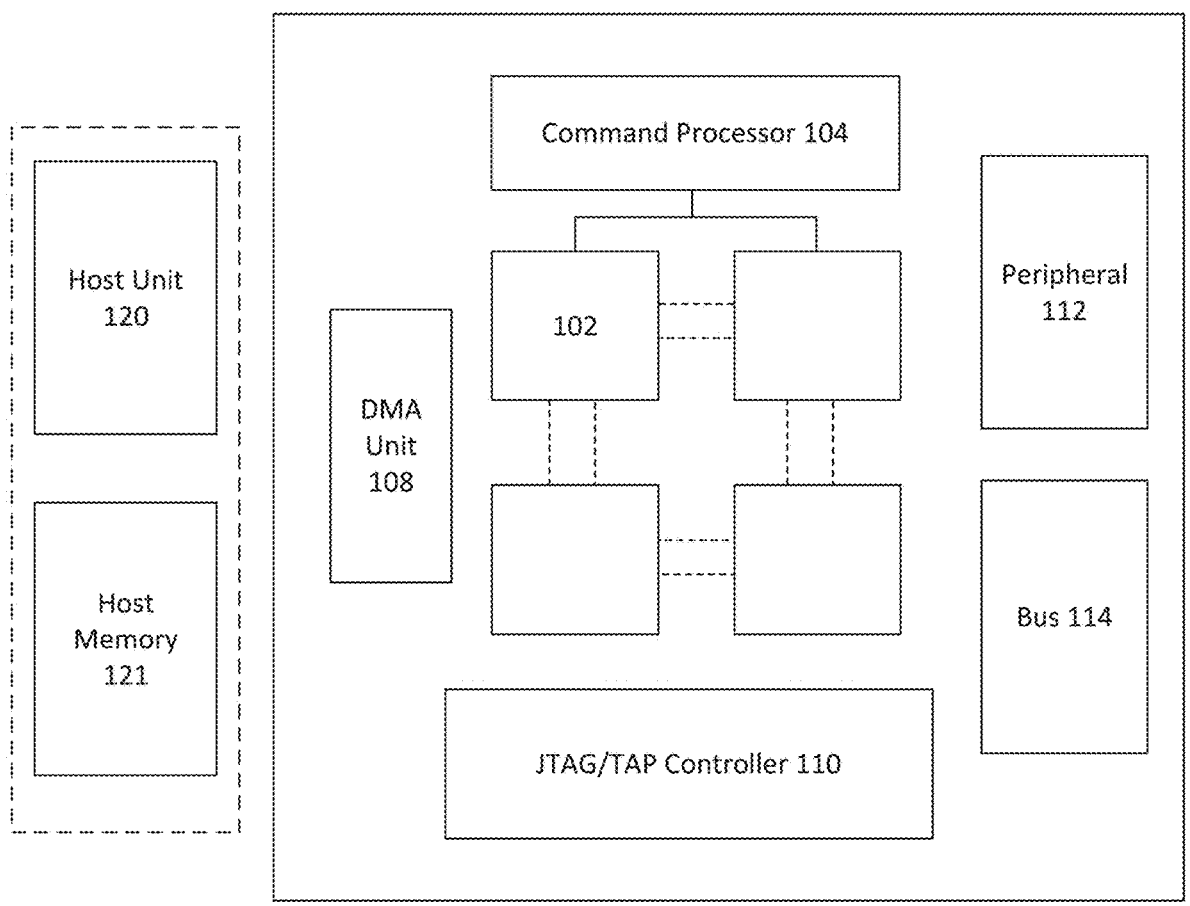
FIG. 1 illustrates an exemplary neural network accelerator architecture, in accordance with disclosed embodiments.

Reference will now be made in detail to exemplary embodiments, discussed with regards to the accompanying drawings. In some instances, the same reference numbers will be used throughout the drawings and the following description to refer to the same or like parts. Unless otherwise defined, technical or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

Computer processors are often tested before use, to reduce the risk of intended design or manufacturing defects that might cause them to behave in unexpected or undesirable ways. However, testing can be a burdensome aspect of computer processor production. Testing each processor may require a relatively long time (e.g., as long as several minutes), depending in part on the complexity of the computer processor and the intended degree of hardware coverage. For example, artificial intelligence accelerators, particularly those used for cloud services, can be very complex. Accordingly, test patterns for such processors are similarly complex and the test times consequently long. Furthermore, computational requirements can limit the number of computer processors tested in parallel. Accordingly, a testing regime may seek to balance production requirements and testing expenses against the risk of unexpected or undesirable behavior.

In accordance with disclosed embodiments, a testing system can repeatedly test a processer using a sequence of test data. The testing system can provide test data in the sequence to the processer (e.g., by scanning the test data into the processor). The test data may be generated by automatic test pattern generation software and may include configuration information and test information. The configuration information can group processing elements of the processors. The configuration information can configure the many-core processor to broadcast the test information to each group of cores. The test data can be based on a dataflow of the processor, as described herein.

The testing system can cause the processor to generate test outputs based on the test information, in accordance with disclosed embodiments. The testing system can obtain the test outputs from the processor (e.g., by scanning out the test outputs from the processor). According to known methods, based on the test outputs, the testing system can determine whether logical or physical elements in each processing element of the processor are faulty. A degree of test coverage can be associated with each processing element in the processor for each test. The degree of test coverage provided by a test can vary between processing elements in each group of processing elements. In a single test, a target degree of test coverage may only be achieved by a subset of processing elements in each group. By performing the same test multiple times with different groupings of cores, the target degree of test coverage can be achieved for all processing elements in the processor. In each test, the test information can be the same for all groups of processing elements. Because the test information can concern only the processing elements in a group of processing elements, rather than the processing elements in the entire processor, the test information can be smaller, less complex, or easier to generate than test information concerning the entire many-core processor. Furthermore, each test may be performed more quickly, reducing overall test time while maintaining the desired degree of test coverage.

In some embodiments, parallel testing of groups of cores can provide a ten-fold or greater reduction in time or memory usage, as compared to testing the entire many-core processor at once. Furthermore, the parallelism inherent in this approach enables efficient scaling. For example, in some embodiments, testing time is not a function of the number of cores. Instead, in some embodiments, the testing time may be constant, regardless of the number of cores tested.

FIG. 1 illustrates an exemplary neural network accelerator architecture suitable for use with the disclosed embodiments, consistent with embodiments of the present disclosure. In the context of this disclosure, a neural network accelerator may also be referred to as a machine learning accelerator, deep learning accelerator, or many-core processor. In some embodiments, accelerator architecture 100 may be referred to as a neural network processing unit (NPU) architecture 100. As shown in FIG. 1, accelerator architecture 100 can include a plurality of cores 102, a command processor 104, a direct memory access (DMA) unit 108, a Joint Test Action Group (JTAG)/Test Access End (TAP) controller 110, a peripheral interface 112, a bus 114, and the like.

It is appreciated that, cores 102 can perform algorithmic operations based on communicated data. Cores 102 can include one or more processing elements that may include single instruction, multiple data (SIMD) architecture including one or more processing units configured to perform one or more operations (e.g., multiplication, addition, multiply-accumulate, etc.) based on commands received from command processor 104. To perform the operation on the communicated data packets, cores 102 can include one or more processing elements for processing information in the data packets. Each processing element may comprise any number of processing units. According to some embodiments of the present disclosure, accelerator architecture 100 may include a plurality of cores 102, e.g., four cores. In some embodiments, the plurality of cores 102 can be communicatively coupled with each other. For example, the plurality of cores 102 can be connected with a single directional ring bus, which supports efficient pipelining for large neural network models. The architecture of cores 102 will be explained in detail with respect to FIG. 2B.

Command processor 104 can interact with a host unit 120 and pass pertinent commands and data to corresponding core 102. In some embodiments, command processor 104 can interact with host unit under the supervision of kernel mode driver (KMD). In some embodiments, command processor 104 can modify the pertinent commands to each core 102, so that cores 102 can work in parallel as much as possible. The modified commands can be stored in an instruction buffer. In some embodiments, command processor 104 can be configured to coordinate one or more cores 102 for parallel execution.

DMA unit 108 can assist with transferring data between host memory 121 and accelerator architecture 100. For example, DMA unit 108 can assist with loading data or instructions from host memory 121 into local memory of cores 102. DMA unit 108 can also assist with transferring data between multiple accelerators. DMA unit 108 can allow off-chip devices to access both on-chip and off-chip memory without causing a host CPU interrupt. In addition, DMA unit 108 can assist with transferring data between components of accelerator architecture 100. For example, DMA unit 108 can assist with transferring data between multiple cores 102 or within each core. Thus, DMA unit 108 can also generate memory addresses and initiate memory read or write cycles. DMA unit 108 also can contain several hardware registers that can be written and read by the one or more processors, including a memory address register, a byte-count register, one or more control registers, and other types of registers. These registers can specify some combination of the source, the destination, the direction of the transfer (reading from the input/output (I/O) device or writing to the I/O device), the size of the transfer unit, or the number of bytes to transfer in one burst. It is appreciated that accelerator architecture 100 can include a second DMA unit, which can be used to transfer data between other accelerator architectures to allow multiple accelerator architectures to communicate directly without involving the host CPU.

JTAG/TAP controller 110 can specify a dedicated debug port implementing a serial communications interface (e.g., a JTAG interface) for low-overhead access to the accelerator without requiring direct external access to the system address and data buses. JTAG/TAP controller 110 can also have on-chip test access interface (e.g., a TAP interface) that implements a protocol to access a set of test registers that present chip logic levels and device capabilities of various parts.

Peripheral interface 112 (such as a PCIe interface), if present, serves as an (and typically the) inter-chip bus, providing communication between the accelerator and other devices.

Bus 114 (such as a I2C bus) includes both intra-chip bus and inter-chip buses. The intra-chip bus connects all internal components to one another as called for by the system architecture. While not all components are connected to every other component, all components do have some connection to other components they need to communicate with. The inter-chip bus connects the accelerator with other devices, such as the off-chip memory or peripherals. For example, bus 114 can provide high speed communication across cores and can also connect cores 102 with other units, such as the off-chip memory or peripherals. Typically, if there is a peripheral interface 112 (e.g., the inter-chip bus), bus 114 is solely concerned with intra-chip buses, though in some implementations it could still be concerned with specialized inter-bus communications.

Accelerator architecture 100 can also communicate with a host unit 120. Host unit 120 can be one or more processing unit (e.g., an X86 central processing unit). As shown in FIG. 1, host unit 120 may be associated with host memory 121. In some embodiments, host memory 121 may be an integral memory or an external memory associated with host unit 120. In some embodiments, host memory 121 may comprise a host disk, which is an external memory configured to provide additional memory for host unit 120. Host memory 121 can be a double data rate synchronous dynamic random-access memory (e.g., DDR SDRAM) or the like. Host memory 121 can be configured to store a large amount of data with slower access speed, compared to the on-chip memory integrated within accelerator chip, acting as a higher-level cache. The data stored in host memory 121 may be transferred to accelerator architecture 100 to be used for executing neural network models.

In some embodiments, a host system having host unit 120 and host memory 121 can comprise a compiler (not shown). The compiler is a program or computer software that transforms computer codes written in one programming language into instructions for accelerator architecture 100 to create an executable program. In machine learning applications, a compiler can perform a variety of operations, for example, pre-processing, lexical analysis, parsing, semantic analysis, conversion of input programs to an intermediate representation, initialization of a neural network, code optimization, and code generation, or combinations thereof. For example, the compiler can compile a neural network to generate static parameters, e.g., connections among neurons and weights of the neurons.

In some embodiments, host system including the compiler may push one or more commands to accelerator architecture 100. As discussed above, these commands can be further processed by command processor 104 of accelerator architecture 100, temporarily stored in an instruction buffer of accelerator architecture 100, and distributed to corresponding one or more cores (e.g., cores 102 in FIG. 1) or processing elements. Some of the commands may instruct a DMA unit (e.g., DMA unit 108 of FIG. 1) to load instructions and data from host memory (e.g., host memory 121 of FIG. 1) into accelerator architecture 200. The loaded instructions may then be distributed to each core (e.g., core 102 of FIG. 1) assigned with the corresponding task, and the one or more cores may process these instructions.

Figure 2A:
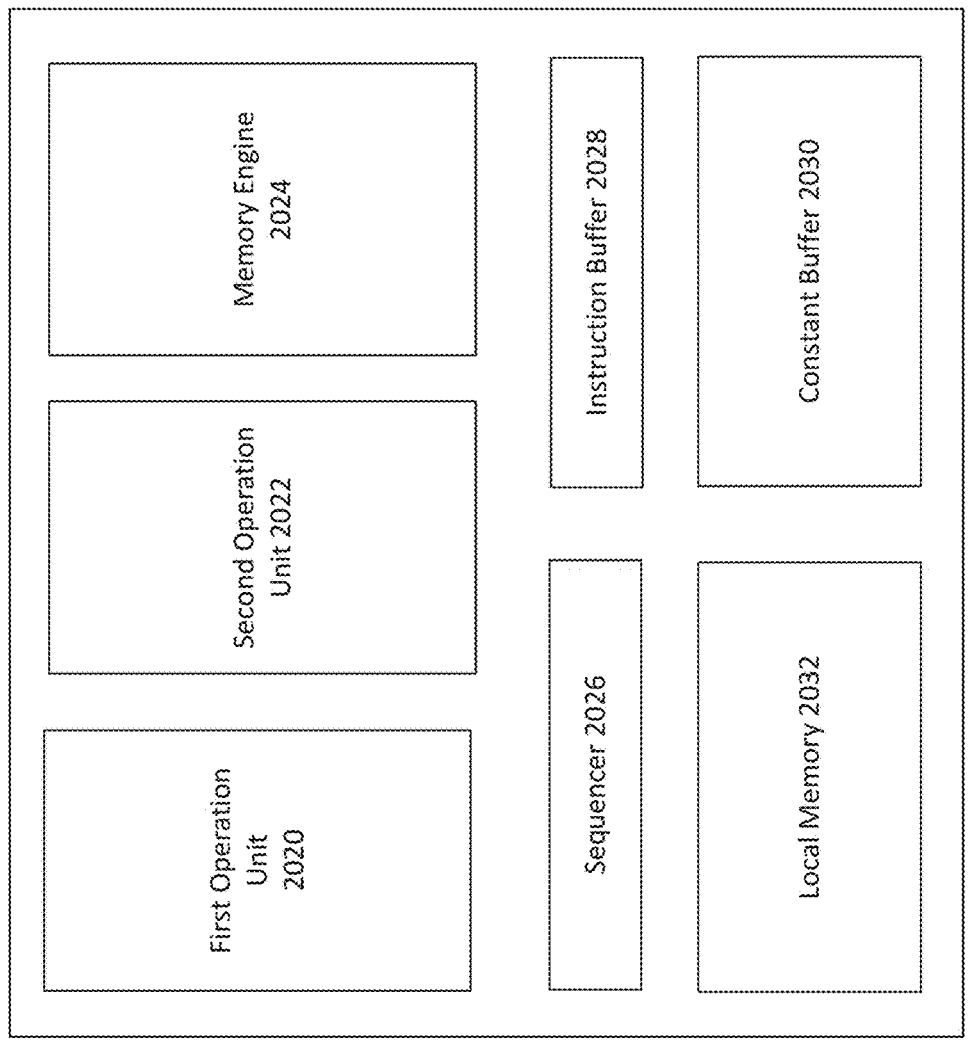
FIG. 2A illustrates an exemplary neural network accelerator core architecture, in accordance with disclosed embodiments.

It is appreciated that the first few instructions received by the cores 102 may instruct the cores 102 to load/store data from host memory 121 into one or more local memories of the cores (e.g., local memory 2032 of FIG. 2A). Each core 102 may then initiate the instruction pipeline, which involves fetching the instruction (e.g., via a sequencer) from the instruction buffer, decoding the instruction (e.g., via a DMA unit 108 of FIG. 1), generating local memory addresses (e.g., corresponding to an operand), reading the source data, executing or loading/storing operations, and then writing back results.

According to some embodiments, accelerator architecture 100 can further include a global memory (not shown) having memory blocks (e.g., 4 blocks of 8 GB second generation of high bandwidth memory (HBM2)) to serve as main memory. In some embodiments, the global memory can store instructions and data from host memory 121 via DMA unit 108. The instructions can then be distributed to an instruction buffer of each core assigned with the corresponding task, and the core can process these instructions accordingly.

In some embodiments, accelerator architecture 100 can further include memory controller (not shown) configured to manage reading and writing of data to and from a specific memory block (e.g., HBM2) within global memory. For example, memory controller can manage read/write data coming from core of another accelerator (e.g., from DMA unit 108 or a DMA unit corresponding to another accelerator) or from core 102 (e.g., from a local memory in core 102). It is appreciated that more than one memory controller can be provided in accelerator architecture 100. For example, there can be one memory controller for each memory block (e.g., HBM2) within global memory.

Memory controller can generate memory addresses and initiate memory read or write cycles. Memory controller can contain several hardware registers that can be written and read by the one or more processors. The registers can include a memory address register, a byte-count register, one or more control registers, and other types of registers. These registers can specify some combination of the source, the destination, the direction of the transfer (reading from the input/output (I/O) device or writing to the I/O device), the size of the transfer unit, the number of bytes to transfer in one burst, or other typical features of memory controllers.

While accelerator architecture 100 of FIG. 1 can be used for convolutional neural networks (CNNs) in some embodiments of the present disclosure, it is appreciated that accelerator architecture 100 of FIG. 1 can be generally utilized in many-core processors, including those used for various neural networks, such as deep neural networks (DNNs), recurrent neural networks (RNNs), or the like. In addition, some embodiments can be configured for various processing architectures, such as neural network processing units (NPUs), graphics processing units (GPUs), field programmable gate arrays (FPGAs), tensor processing units (TPUs), application-specific integrated circuits (ASICs), any other types of heterogeneous accelerator processing units (HAPUs), or the like FIG. 2A illustrates an exemplary core architecture, consistent with embodiments of the present disclosure. As shown in FIG. 2A, core 102 can include one or more operation units such as first and second operation units 2020 and 2022, a memory engine 2024, a sequencer 2026, an instruction buffer 2028, a constant buffer 2030, a local memory 2032, or the like. The architecture disclosed in FIG. 2A is intended to be exemplary and non-limiting, as the disclosed embodiments can generally be implemented on many-core processors, not just many-core processor with the architecture depicted in FIG. 2A.

One or more operation units can include first operation unit 2020 and second operation unit 2022. First operation unit 2020 can be configured to perform operations on received data (e.g., matrices). In some embodiments, first operation unit 2020 can include one or more processing units configured to perform one or more operations (e.g., multiplication, addition, multiply-accumulate, element-wise operation, etc.).

Second operation unit 2022 can be configured to perform a pooling operation, an interpolation operation, a region-of-interest (ROI) operation, and the like. In some embodiments, second operation unit 2022 can include an interpolation unit, a pooling data path, and the like.

Memory engine 2024 can be configured to perform a data copy within a corresponding core 202 or between two cores. DMA unit 208 can assist with copying data within a corresponding core or between two cores. For example, DMA unit 208 can support memory engine 2024 to perform data copy from a local memory (e.g., local memory 2032 of FIG. 2A) into a corresponding operation unit. Memory engine 2024 can also be configured to perform matrix transposition to make the matrix suitable to be used in the operation unit.

Sequencer 2026 can be coupled with instruction buffer 2028 and configured to retrieve commands and distribute the commands to components of core 202. For example, sequencer 2026 can distribute convolution commands or multiplication commands to first operation unit 2020, distribute pooling commands to second operation unit 2022, or distribute data copy commands to memory engine 2024. Sequencer 2026 can also be configured to monitor execution of a neural network task and parallelize sub-tasks of the neural network task to improve efficiency of the execution. In some embodiments, first operation unit 2020, second operation unit 2022, and memory engine 2024 can run in parallel under control of sequencer 2026 according to instructions stored in instruction buffer 2028.

Instruction buffer 2028 can be configured to store instructions belonging to the corresponding core 202. In some embodiments, instruction buffer 2028 is coupled with sequencer 2026 and provides instructions to the sequencer 2026. In some embodiments, instructions stored in instruction buffer 2028 can be transferred or modified by command processor 204.

Constant buffer 2030 can be configured to store constant values. In some embodiments, constant values stored in constant buffer 2030 can be used by operation units such as first operation unit 2020 or second operation unit 2022 for batch normalization, quantization, de-quantization, or the like.

Local memory 2032 can provide storage space with fast read/write speed. To reduce possible interaction with a global memory, storage space of local memory 2032 can be implemented with large capacity. With the massive storage space, most of data access can be performed within core 102 with reduced latency caused by data access. In some embodiments, to minimize data loading latency and energy consumption, SRAM (static random-access memory) integrated on chip can be used as local memory 2032. In some embodiments, local memory 2032 can have a capacity of 192 MB or above. According to some embodiments of the present disclosure, local memory 2032 be evenly distributed on chip to relieve dense wiring and heating issues.

Figure 2B:
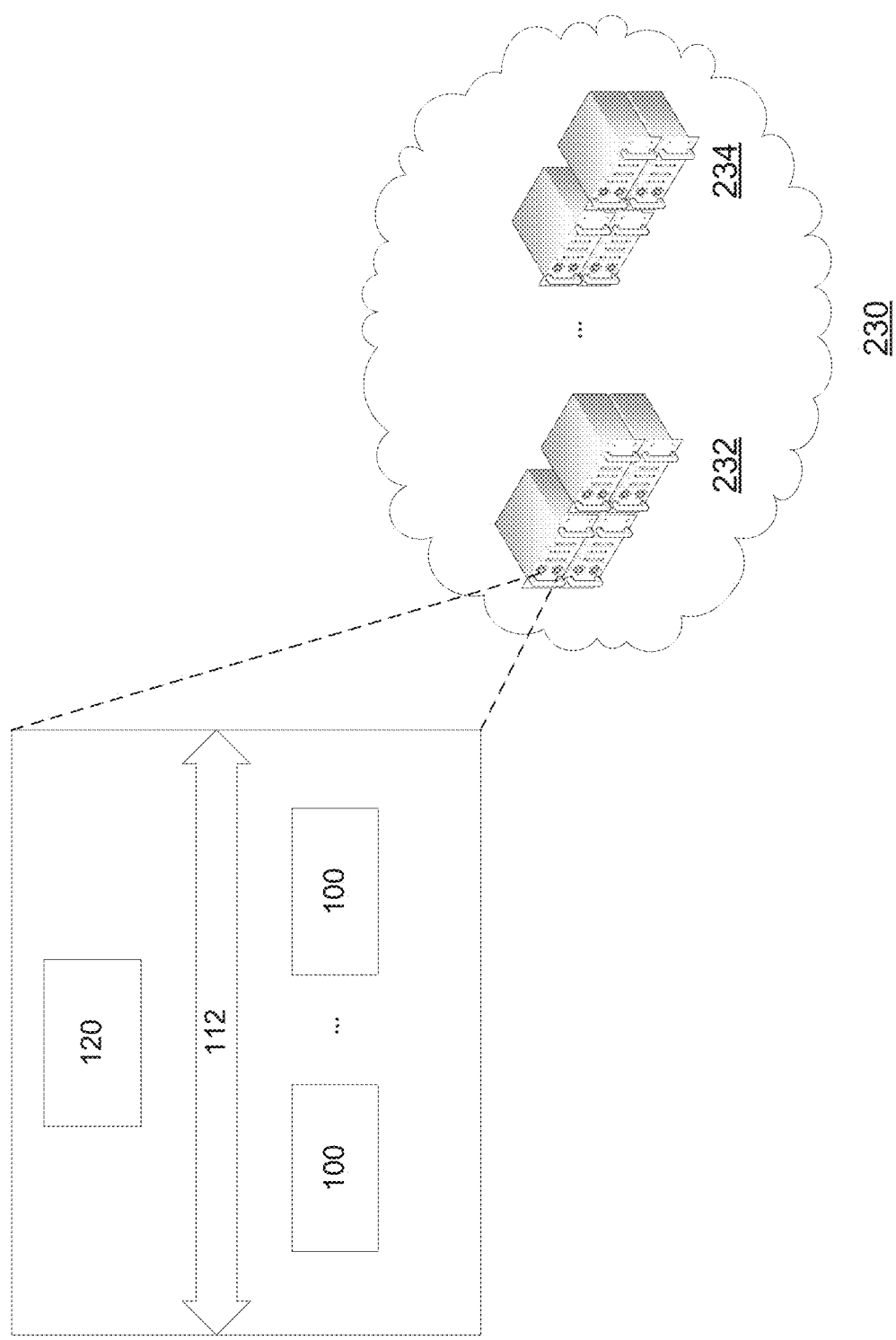
FIG. 2B illustrates a schematic diagram of an exemplary cloud system incorporating a neural network accelerator, in accordance with disclosed embodiments.

FIG. 2B illustrates a schematic diagram of an exemplary cloud system incorporating accelerator architecture 100, consistent with embodiments of the present disclosure. As shown in FIG. 2B, cloud system 230 can provide a cloud service with artificial intelligence (AI) capabilities and can include a plurality of computing servers (e.g., 232 and 234). In some embodiments, a computing server 232 can, for example, incorporate a neural network accelerator architecture 100 of FIG. 1. Neural network accelerator architecture 100 is shown in FIG. 2B in a simplified manner for simplicity and clarity.

With the assistance of neural network accelerator architecture 100, cloud system 230 can provide the extended AI capabilities of image recognition, facial recognition, translations, 3D modeling, and the like. It is appreciated that, neural network accelerator architecture 100 can be deployed to computing devices in other forms. For example, neural network accelerator architecture 100 can also be integrated in a computing device, such as a smart phone, a tablet, and a wearable device.

Figure 3:
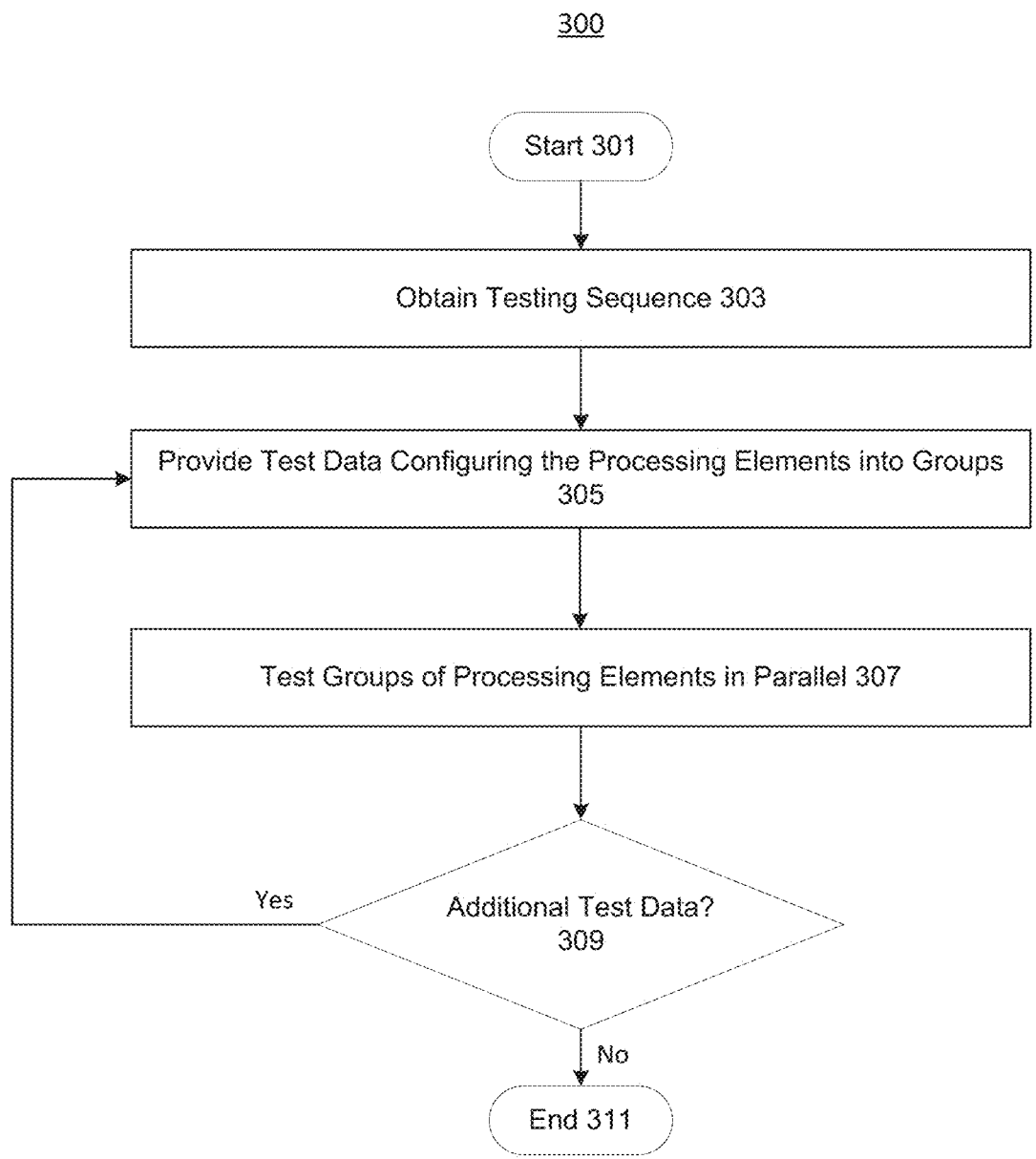
FIG. 3 depicts a flowchart of an exemplary method of testing many-core processors, in accordance with some embodiments of the present disclosure.

FIG. 3 depicts a flowchart of an exemplary method 300 of testing many-core processors (e.g., the exemplary many-cored processor depicted in FIGS. 1 to 2B), in accordance with some embodiments of the present disclosure. Method 300 can depend on the design and dataflow of the tested many-core processor. Method 300 can include repeatedly testing, by a testing system, the many-core processor. A test can include providing, by the test system to the many-core processor, test data that groups processing elements (e.g., grouping cores when each core includes a single processing element) according to a dataflow among the processing elements. Each group can then be tested in parallel. In each test, the test system can provide test data that groups the processing elements differently. Each test can provide a target degree of hardware coverage for a subset of the processing elements in each group. By conducting multiple tests with different groupings of the processing elements, the target degree of hardware coverage can be obtained for each processing element in the many-core processor.

In operation 303 of method 300, after starting in operation 301, the testing system can be configured to obtain a testing sequence. The testing sequence can specify multiple tests. In each test, the testing system can provide test data that groups the processing elements in the many-core processor differently. Each test may provide a target degree of test coverage for a subset of the processing elements of each group. In some embodiments, completion of the test sequence can result in obtaining a target degree of test coverage for a target proportion of the processing elements in the many-core processor. The target proportion can be 90% or greater, 95% or greater, 99% or greater, or even greater. In some embodiments, the target proportion can be all processing elements in the many-core processor.

The test data can include configuration information and test information. The configuration information can specify a grouping of the cores in the many-core processor. The grouping can depend on a dataflow among the processing elements, in accordance with disclosed embodiments.

The dataflow of a many-core processor can describe the receipt and provision of data by processing elements of the many-core processor during operation (e.g., as opposed to testing) of the many-core processor, in accordance with disclosed embodiments. Processing elements can perform operations on data received from one or more other processing elements earlier in the dataflow. Processing elements can provide the results of these operations to one or more other processing elements later in the dataflow. For example, processing elements in a systolic array can receive data from one or more adjacent processing elements and provide data to one or more other adjacent processing elements. As another example, processing elements in a pipeline can receive data from the preceding processing element in the pipeline and provide the data to the subsequent element in the pipeline. In this manner, the dataflow can describe a dependency relationship between the processing elements. Faults in processing elements earlier in the dataflow may affect the output of processing elements later in the dataflow, even when the later processing elements are performing correctly.

The dataflow can depend on the task to be performed by the many-core processor (e.g., image compression or decompression, neural network inference or training, or the like). In some embodiments, the dataflow can be fixed. For example, the dataflow can be set in hardware when the many-core processor is produced. In various embodiments the dataflow can be variable. For example, the dataflow can be configured through instructions sent to the chip (e.g., settings on multiplexers or routers on the multi-core processor). To continue this example, configuring the many-core processor to perform a task can include configuring the dataflow of the many-core processor.

The configuration information in the test data can group the processing elements of the many-core processor into groups of processing elements for testing. The groups can be determined according to the dataflow such that each group includes at least one target processing element to be tested with a determined degree of hardware coverage. In some embodiments, to ensure the determined degree of hardware coverage, the group can include the processing elements upon which the target processing element depends. By including these processing elements, all the inputs to the target processing element can be controlled. For example, when each processing element depends on two other processing elements, a group could include at least three processing elements: the target processing element and the two processing elements upon which the target processing element depends. In some embodiments, the processing elements within each group may be identical. In some instances, the composition of each group may be identical, but the processing elements within each group may differ. For example, each group may include two cores of a first type and two cores of a second type.

A scan path can be associated with each group, in accordance with disclosed embodiments. The scan path can be formed from scan chains. Each scan chain can be associated with one processing element in the group. In some instances, a shift register of a processing element can be, or be part of, a scan chain for a processing element. In some implementations, the shift register can comprise multiple flip-flops. In some implementations, the shift register can include some proportion of the flip-flops in a processing element. In some embodiments, the scan register can include each flip-flop in the processing elements. Accordingly, setting the values of the scan register can set the values of each flip-flop in the processing element, at least in part determining a state of the processing element. The scan path can connect the scan chains such that data shifted out of a first scan chain in the scan path is shifted into the next scan chain in the scan path.

A scan path in a test can depend on the configuration information received from the test system. The scan path can depend on connections between the scan chains comprising the scan path. In some implementations, the input of a scan chain in a processing element can be connected to the output of another scan chain or to the test system. The input of the scan chain can be connected to the test system directly (e.g., the scan chain can read from an output of the test system) or indirectly (e.g., the scan chain can read from a component of the many-core processor that in turn, directly or through additional components of the many-core processor, receives the input from an output of the test system). In some implementations, the output of a scan chain in a processing element can be connected to the input of another scan chain or to the test system. The output of the scan chain can be connected to the test system directly (e.g., the scan chain can write to an input of the test system) or indirectly (e.g., the scan chain can write to a component of the many-core processor that in turn, directly or through additional components of the many-core processor, provides the output to an input of the test system). The configuration information can determine the scan path by determining whether the output or input of the scan chain is connected to the test system (directly or indirectly) or to the input or output of another scan chain, respectively. When the output or input of the scan chain is connected to the input or output of another scan chain, respectively, the configuration information can determine which other scan chain. In some embodiments, connections between scan chains, or between scan chains and the testing system, can be established by multiplexers. The multiplexers can be configured by the configuration information to determine the scan path.

The test information can be shifted into the scan chains along the scan path. The test information can include test values. As disclosed herein, the test values can at least in part determine a state of the processing element. The test data can be determined and configured to provide a target degree of hardware coverage for one or more processing element in each group. The desired degree of hardware coverage can be 90% or higher, 95% or higher, 98% or higher, 99% or higher, or another suitable degree of hardware coverage. In some embodiments, the test data can provide a lesser degree of hardware coverage for other processing elements in each group. For example, when a group includes three processing elements, one of which is dependent on the other two, according to the dataflow, then the test data can provide a high degree of coverage to the dependent processing element (e.g., 90%, 95%, 98%, or higher) and lower degrees of coverage to the other processor elements (e.g., 40% or higher, or the like). The degrees of coverage provided to the other processor elements can be the same, or different.

In operation 305 of method 300, test data can be provided to the many-core processor. The test data can be provided by communicatively connecting the many-core processor to the test system. For example, the many-core processor can be mounted on a test socket of the test system. As an additional example, the many-core processor can be contacted by the probes of a probe card of the test system. In some embodiments, the test system can be configured to test multiple many-core processors contemporaneously, concurrently, or simultaneously. The test-system can be configured to provide the test data by scanning the test data into the many-core processor. For example, the test system can provide one or more values of the test data to input to the many-core processor and apply (or cause the many-core processor to apply) one or more clock pulses, causing the many-core processor to read and store the one or more values. The test system can repeat this process, providing the next one or more values in the test data in each repeat, until the values of the test data have been read and stored by the many-core processor. In some embodiments, the test system can cause the many-core processor to enter a scanning mode, then scan in the test data.

In step 307 of method 300, the testing system can test the groups of processing elements in parallel. In some embodiments, the testing system can cause the many-core processor to perform one or more operations. For example, the testing system can apply one or more clock pulses to the processing elements (or cause one or more clock pulses to be applied to the processor elements). The operations can transition the many-core processor to a new state. This new state can be reflected in the values of the scan chain for each processing element in the many-core processor. After the test, the testing system can read test results from the many-core processor. In some embodiments, the test results can be, or include, the values in the scan chain for each processing element in the many-core processor. In some implementations, the output of a test can be or include the test results for each group of processing elements. For example, the test system can address a group and shift the test results out, in much the same way the test data was shifted in. In various embodiments, the test output can be or include a compacted output based on the test results of multiple groups. In some implementations, circuitry disposed on the many-core processor (or on a separate device, such as the test system) can generate a compacted output from the test results for multiple groups. The compacted output may include less data than the collective test results for the multiple groups. Accordingly, the test system may require less time or computing resources to obtain the compacted output from the many-core processor than the collective results for the multiple groups. The test system can be configured to analyze the test output to determine whether a fault (e.g., a stuck-at faults, timing faults, or the like) exists in one or more of the processing elements in each group. Such a determination may include a comparison of the test output to an expected test output. The disclosed embodiments may use known methods of analyzing the test output and are not limited to any particular analysis method.

In step 309 of method 300, the testing system can determine whether further testing is required, in accordance with disclosed embodiments. As described herein, the testing system can be configured to sequentially provide test data to the many-core processor. In some embodiments, after each test, the testing system can determine whether the sequence includes additional test data. When the sequence includes additional test data, the method 300 can proceed to step 305 and provide the additional test data. In some embodiments, after each test, the testing system can determine whether additional test data is required based on the test output. For example, inconclusive or potentially erroneous test output may cause the testing system to repeat a test or provide additional test data. In some embodiments, after each test, the testing system can determine whether testing should be aborted (e.g., in response to detection of a fault in a processing element). When further testing is not required, method 300 can proceed to step 311.

In step 311 of method 300, method 300 can end. In some embodiments, method 300 can end once the processing elements in the many-core processor have all been tested. In various embodiments, method 300 can end once a fault in the multicore processor is identified. In some embodiments, method 300 can include additional steps of generating or providing a report on the many-core processor. The report can indicate the test performed, the test data used, whether the many-core processor successfully passed the test, any fault identified in the multi-core processor, test-time, or other parameters or results or the test.

Figure 4B:
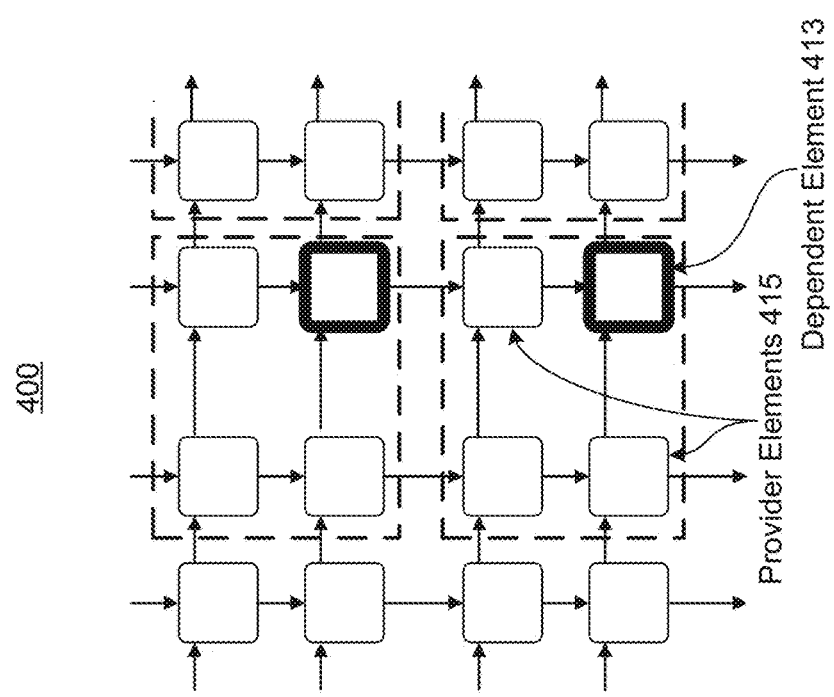
FIGS. 4A and 4B depict exemplary schematics of processing elements grouped according to a first dataflow, in accordance with some embodiments of the present disclosure.
Figure 4A:
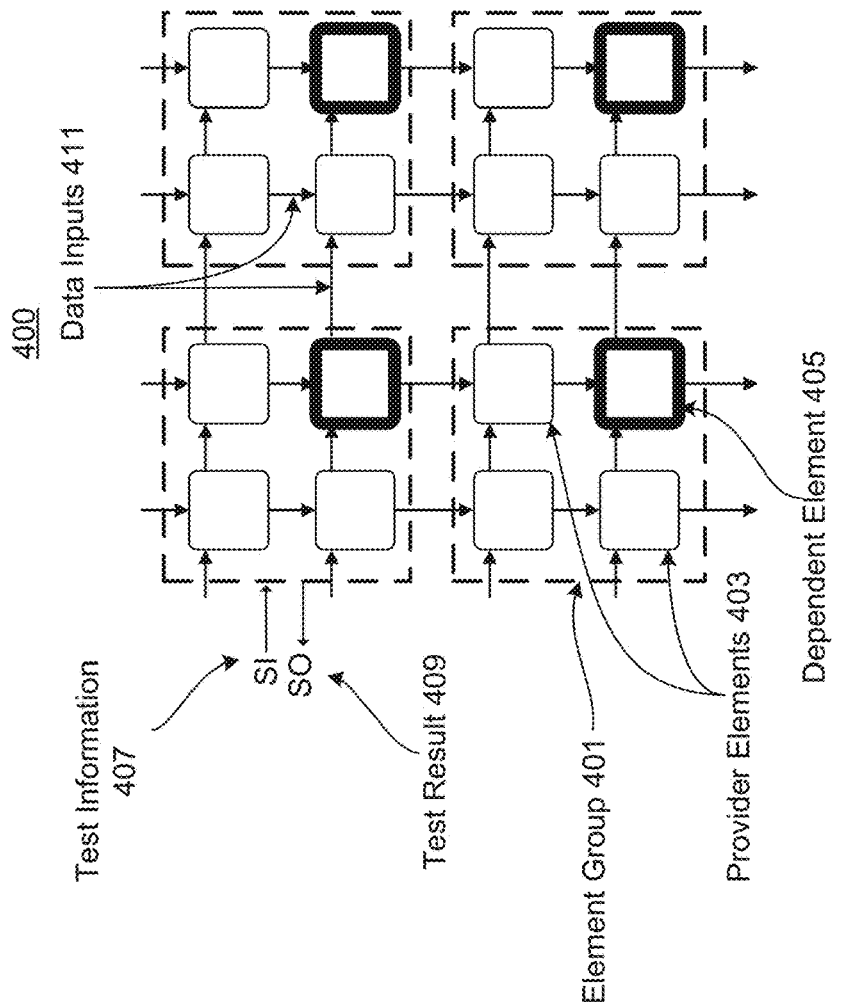

FIGS. 4A and 4B depict exemplary schematics of at least some of the processing elements of a many-core processor 400, in accordance with disclosed embodiments. In this example, many-core processor 400 is configured with a dataflow. Each processing element depicted in FIGS. 4A and 4B is configured to receive input data from the processing element above it and the processing element to the left of it (e.g., data inputs 411). Each depicted processing element provides output data to the processing element below it and the processing element to the right of it. For example, the depicted processing elements can represent a two-dimensional systolic array.

As depicted in FIGS. 4A and 4B, a test system can provide test data including configuration information and test information to many-core processor 400. The configuration information can group the processing elements according to the dataflow of many-core processor 400. FIG. 4A depicts a first grouping of sixteen processing elements (e.g., processing elements such as provider elements 403 and dependent element 405) into four groups (e.g., element group 401) of four processing elements each. Each group includes a processing element that only receives inputs from other processing elements in the same group (e.g., dependent element 405 only receives input data from provider elements 403). Each group also includes three processing elements that receive inputs from processing elements not in the same group (e.g. provider elements 403, which each receive some inputs from outside the group). In some embodiments, a greater degree of test coverage can be achieved for the subset of processing elements that only receive inputs from other processing elements in the same group (e.g., a greater degree of test coverage can be achieved for dependent element 405 than either of provider elements 403). In some embodiments, the greater degree of coverage can be achieved because the test information for the group controls all the inputs to the subset of processing elements that only receive inputs from other processing elements in the same group. For example, the test information for element group 401 can set all the inputs to dependent element 405, but not all the inputs to provider elements 403. Accordingly, a greater degree of hardware coverage can be obtained for dependent element 405 than for provider elements 403.

The test data can include test information, consistent with disclosed embodiments. The test information (e.g., test information 407) can be provided to each group in FIG. 4A. Each group can perform a test using the test information to generate a test result (e.g., test result 409). The output of the test can be or include the test results from each group. In various embodiments, the test information and the test results can be provided by the test system and provided to the test system, respectively, in parallel or at least partially sequentially (e.g., the test results can be read out in subsets, with the test results in each subset read out in parallel and the subsets read out sequentially). In some embodiments, the test output can be generated from the test results for each group using circuitry (e.g., circuitry on the many-core processor or separate from the many core processor) before being provided to the test system.

FIG. 4B depicts a second grouping of the processing elements. The second grouping can be produced by configuration information in second test data provided by the test system. With respect to the first grouping in FIG. 4A, the groupings depicted in FIG. 4B is shifted to the right by one column of processing elements. Because the groups have changed, the subset of processing elements that only receive inputs from other processing elements in the same group has also changed (e.g., dependent element 405, which only received inputs from provider elements 403, has been replaced with dependent element 413, which only receives inputs from provider elements 415). Test information can be provided to each group in FIG. 4B, as described herein. As described above with regards to FIG. 4A, each group can perform testing using the test information to generate test results. The test output can be or include the test results for each group, or can be or include a compacted output generated from the test results for multiple groups. In some embodiments, the same test information used to test the groups in FIG. 4A can be used to test the groups in FIG. 4B. In various embodiments, for example when the composition or arrangement of the groups in FIG. 4A differs from the composition or arrangement of the groups in FIG. 4B, the test information can differ between iterations of testing.

As can be appreciated from FIGS. 4A and 4B, by conducting four tests, each with differing configuration information that re-groups the processing elements of many-core processor 400 differently, each processing element can be tested under conditions in which all inputs to that processing element are controlled. Accordingly, each such processing element can be tested under conditions enabling a target degree of test coverage.

In some embodiments, test data or coverage levels for boundary processing elements can differ from test data or coverage levels for other processing elements of many-core processor 400. As a non-limiting example, when the first column and first row in FIG. 4A form the boundary of a systolic array, at least one input to the processing elements in these columns and rows may be an input provided to the systolic array from top level of the many-core processor 400 (e.g., the processing element is on the "boundary" of the systolic array). For example, the left inputs to the processing elements in the first column may be inputs provided to the systolic array from the top level of the many-core processor 400. Top-off testing can be performed to address such processing elements. In some embodiments, all similar groups of boundary elements can be tested in parallel. For example, all groups including only two left-edge, right-edge, top-edge, or bottom-edge processing elements, respectively, may be tested in parallel. The test information for such boundary groups may depend on the boundary (e.g., left, right, top, bottom) and may differ from the test information for the other groups. In some embodiments, each corner may be tested separately to ensure at least the target degree of test coverage. In each case, the test information may be configured to ensure at least the target degree of test coverage.

Figure 4C:
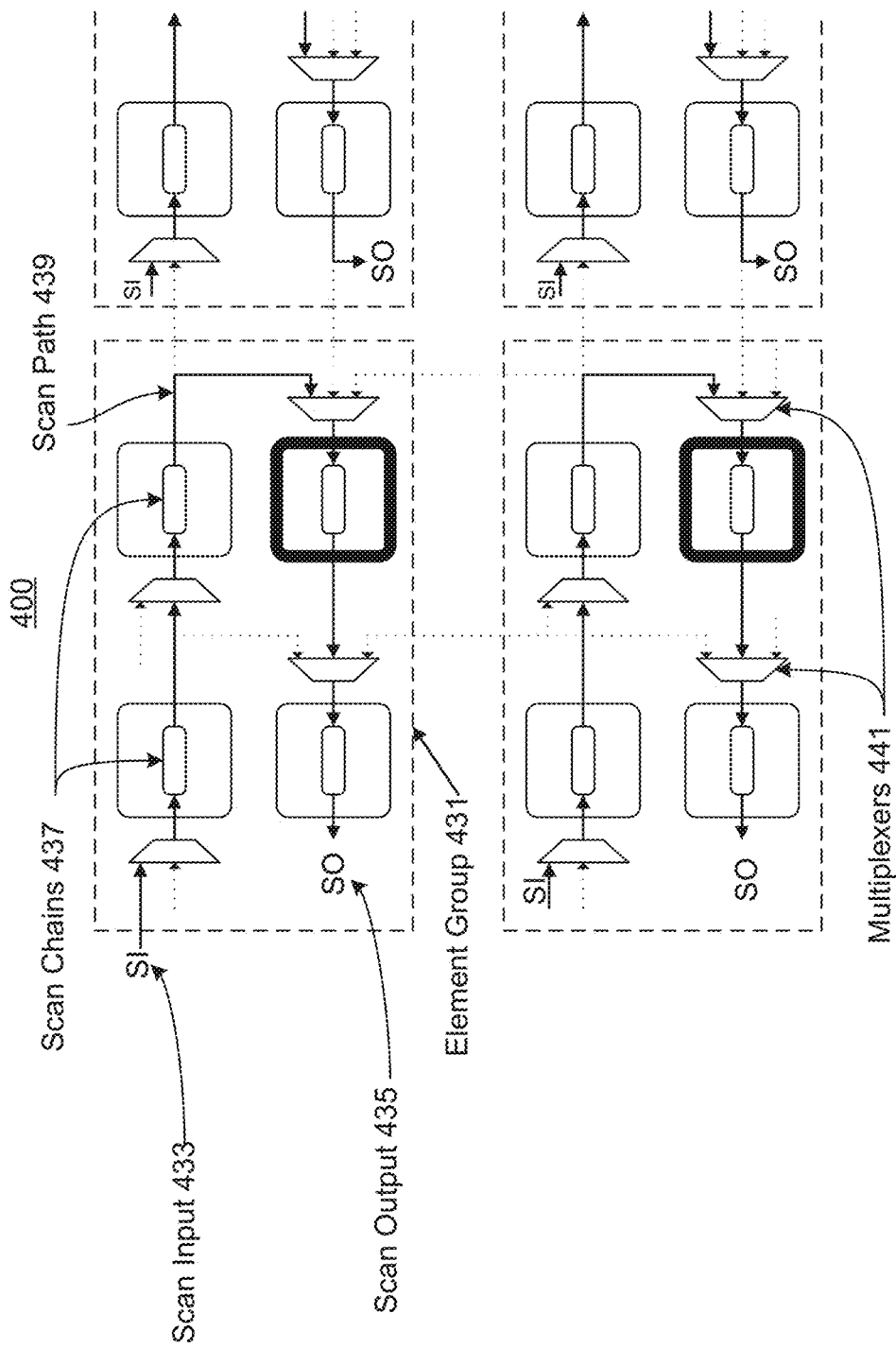
FIG. 4C depicts an exemplary schematic of a testing architecture for grouped processing elements, in accordance with some embodiments of the present disclosure.

FIG. 4C depicts an exemplary schematic of a testing micro architecture for at least some of the processing elements of a many-core processor 400, in accordance with disclosed embodiments. The processing elements can be grouped into element groups (e.g., element group 431), as described above with regards to FIGS. 4A and 4B.

Test information can be read into each group, in accordance with disclosed embodiments. As depicted in FIG. 4C, the test information can be written into a scan input (scan input 433). The information can be shifted into the scan chains of the processing elements in the group (e.g., scan chains 437). The scan chains can be connected along a scan path (e.g., scan path 439) such that test information can be shifted into the scan chain of any processing element in the group. For example, a portion of the test information can be shifted into scan input 433 of element group 431, through the first three scan chains along scan path 439, and into a desired location in the final scan chain in element group 431.

Scan path 439 in FIG. 4C may be one of multiple potential scan paths connecting scan chains in many-core processor 400. For example, as depicted in FIG. 4C, multiplexers (e.g., multiplexers 441) may be disposed in along the scan path between the processing elements. The multiplexers can be configured to select one of multiple possible data sources for input into the scan chains of the subsequent processing element. In FIG. 4C, the selected scan path is shown as an unbroken line, while the unselected scan path is shown as a dotted line. For example, the multiplexer before the first processing element in element group 431 is configured to select an input from the test equipment. To continue this example, the multiplexer between the second and third processing elements in the scan path is configured to select the output of the second processor.

Test results can be read out of each group after testing, in accordance with disclosed embodiments. As depicted in FIG. 4C, the test results can be shifted out of a scan output (scan output 435). The test results can include the post-test values of flip-flops in the processing elements in the group (e.g., post-test values of flip-flops in scan chains 437). As described herein, the scan chains can be connected along a scan path (e.g., scan path 439) such that the test system can obtain the test results by shifting out the contents of the scan chains.

Figure 5A:
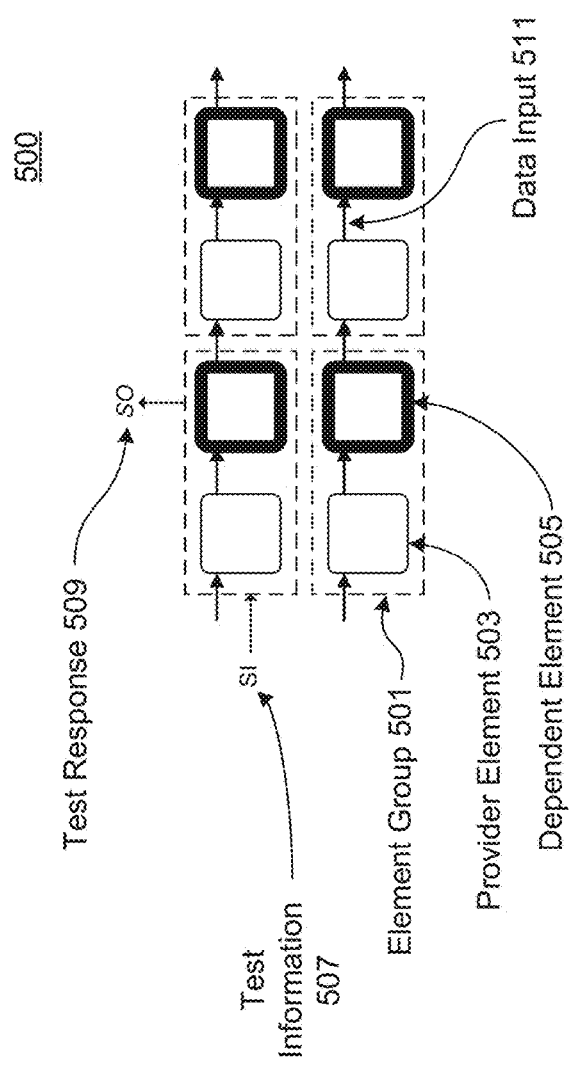
FIGS. 5A and 5B depict exemplary schematics of processing elements grouped according to a second dataflow, in accordance with some embodiments of the present disclosure.
Figure 5B:
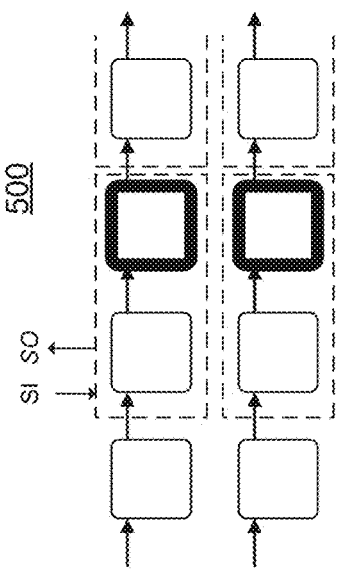

FIGS. 5A and 5B depict exemplary schematics of at least some of the processing elements of a many-core processor 500, in accordance with disclosed embodiments. In this example, many-core processor 500 is configured with a dataflow differing from the dataflow depicted in FIGS. 4A to 4C. According to the dataflow depicted in FIGS. 5A and 5B, each processing element is configured to receive input data from the processing element to the left of it (e.g., data input 511). Each depicted processing element provides output data to the processing element to the right of it. For example, the depicted processing elements can be configured as an array of pipelines, each of which has a one-dimensional data flow.

As depicted in FIGS. 5A and 5B, a test system can provide test data including configuration information and test information to many-core processor 500. The configuration information can group the processing elements according to the dataflow of many-core processor 500. FIG. 5A depicts a first grouping of eight processing elements (e.g., processing elements such as provider element 503 and dependent element 505) into four groups (e.g., element group 501) of two processing elements each. Each group includes a processing element that only receives inputs from other processing elements in the same group (e.g., dependent element 505 only receives input data from provider element 503). Each group also includes a processing element that receive inputs from processing elements not in the same group (e.g. provider element 503, which receive inputs from outside the group). As described herein, in some embodiments, a greater degree of hardware coverage can be achieved for the subset of processing elements that only receive inputs from other processing elements in the same group.

After grouping the processing elements, test information (e.g., test information 507) can be broadcast to each group in FIG. 5A, as described herein. Each group in many-core processor 500 can perform testing using the test information to generate test results (e.g., test results 509). The output of the test can be or include the test results from each group. In various embodiments, the test information and the test results can be provided by the test system and provided to the test system, respectively, in parallel or at least partially sequentially (e.g., the test results can be read out in subsets, with the test results in each subset read out in parallel and the subsets read out sequentially). In some embodiments, the test output can be generated from the test results for each group using circuitry (e.g., circuitry on the many-core processor or separate from the many core processor) before being provided to the test system.

FIG. 5B depicts a second grouping of the processing elements, in accordance with disclosed embodiments. The second grouping can be produced by configuration information in second test data provided by the test system. With respect to the first grouping in FIG. 5A, the grouping depicted in FIG. 5B is shifted to the right by one column of processing elements. Because the groups have changed, the subset of processing elements that only receive inputs from other processing elements in the same group has also changed. Test information can be provided to each group in FIG. 5B, as described herein. Each group can perform testing using the test information to generate test results, which can be read out from each group. The test output can be or include the test results for each group, or can be or include a compacted output generated from the test results for multiple groups. In some embodiments, the same test information used to test the groups in FIG. 4A can be used to test the groups in FIG. 4B. In various embodiments, for example when the composition or arrangement of the groups in FIG. 4A differs from the composition or arrangement of the groups in FIG. 4B, the test information can differ between iterations of testing.

As can be appreciated from FIGS. 5A and 5B, by conducting four tests, each with differing configuration information that re-groups the processing elements of many-core processer 400 differently, each processing element can be tested under conditions in which all inputs to that processing element are controlled. Accordingly, each such processing element can be tested under conditions enabling a target degree of test coverage. In a similar manner to the description above regarding many-core processor 400, test data for boundary groups can differ from test data for other processing elements in many-core processor 500.

FIGS. 5C and 5D depict exemplary schematics of a testing micro architecture for at least some of the processing elements of a many-core processor 500, in accordance with disclosed embodiments. The processing elements can be grouped into element groups (e.g., element group 531), as described above with regards to FIGS. 5A and 5B.

Test information can be read into each group before testing, in accordance with disclosed embodiments. As depicted in FIG. 5C, the test information can be written into a scan input (scan input 533). The information can be shifted into the scan chains of the processing elements in the group (e.g., scan chains 537). The scan chains can be connected along a scan path (e.g., scan path 539) such that test information can be shifted into the scan chain of any processing element in the group. For example, a portion of the test information can be shifted into scan input 533 of element group 531, through the first scan chain along scan path 539, and into a desired location in the second scan chain in element group 531. Scan path 539 in FIG. 5C may be one of multiple potential scan paths connecting scan chains in many-core processor 500. For example, as depicted in FIG. 5D, multiplexers (e.g., multiplexers 543) may be disposed in along the scan path between the processing elements.

Test results can be read out of each group after testing, in accordance with disclosed embodiments. As depicted in FIG. 5C, the test results can be shifted out of a scan output (scan output 535). The test results can include the post-test values of flip-flops in the processing elements in the group (e.g., post-test values of flip-flops in scan chains 537). As described herein, the scan chains can be connected along a scan path (e.g., scan path 539) such that the test system can obtain the test results by shifting out the contents of the scan chains.

As depicted in FIG. 5D, the test system can provide configuration information that regroups the processing elements by changing the scan path (e.g., from scan path 539 to scan path 541), in accordance with disclosed embodiments. In some embodiments, the scan path can be changed by configuring multiplexers 543 to select different sources for input into the test memories of the processing elements. In the non-limiting example depicted in FIG. 5D, the scan output may be provided by the same processing element (the second processing element in the pipeline). However, the scan input may be received by the third processing element in the pipeline, rather than the first processing element. In some embodiments, the differences between scan path 539 and scan path 541 may arise from differences in the layout of many-core processor 500. As a non-limiting example, processing elements in the pipeline may alternate between being configurable to provide scan output and configurable to accept scan input. Because of the differences between scan path 539 and scan path 541, an ordering of the test information shifted along the scan paths may differ, even when the tests performed on element group 531 and element group 532 are the same. For example, the test information for the dependent processing element may be shifted in first on scan path 539 and shifted in second on scan path 541.

Figure 6:
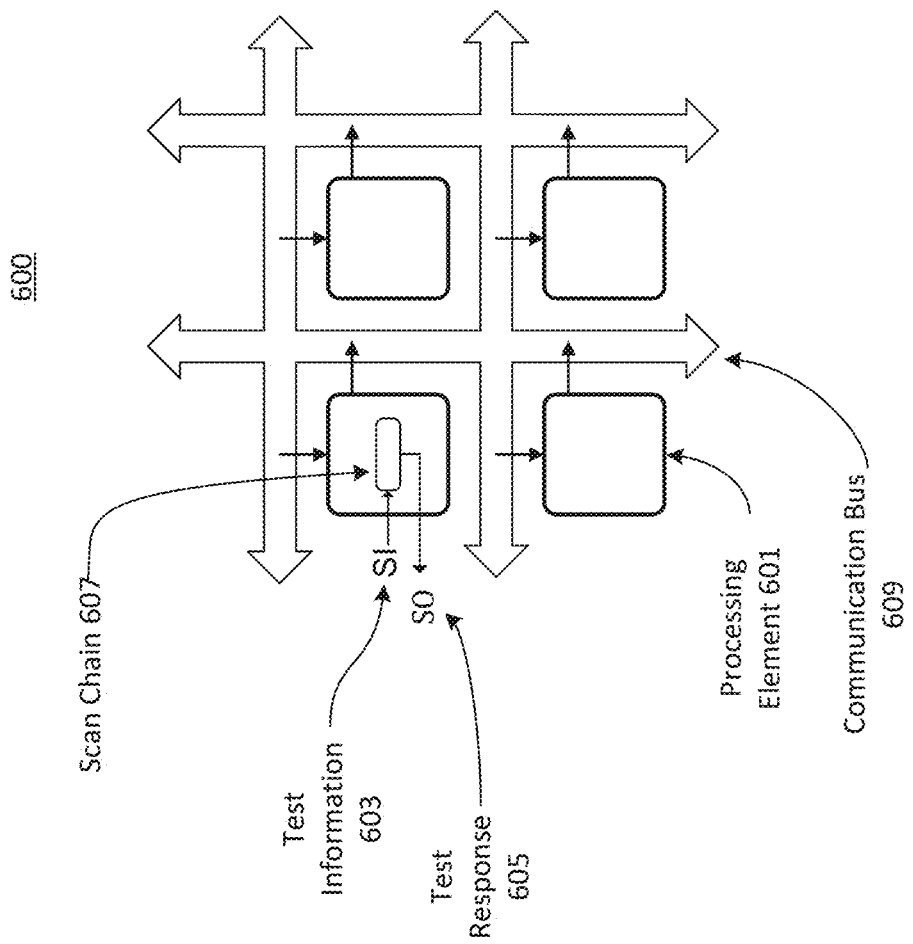
FIG. 6 depicts an exemplary schematic of a processing element grouped according to a third dataflow, in accordance with some embodiments of the present disclosure.

FIG. 6 depicts an exemplary schematic of at least some of the processing elements of a many-core processor 600, in accordance with disclosed embodiments. In this third dataflow, each processing element (e.g., processing element 601) receives input data from, and provides output data to, only communications bus 609. Accordingly, the inputs to each processing element can be individually controlled without relying on other processing elements. In some embodiments, the states of flip-flops, latches, or logic elements within each processing element can be controlled by shifting test information (e.g., test information 603) into a scan chain (e.g., scan chain 607) for each processing element. Each processing element therefore forms a separate group and the processing elements in many-core processor 600 can be tested in parallel. In some embodiments, testing of many-core processor 600 can be accomplished in a single test, as there may be no need to regroup the processing elements, as none of the processing elements are dependent on another processing element.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware, but systems and methods consistent with the present disclosure can be implemented with hardware and software. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

The embodiments may further be described using the following clauses:

1. A processor comprising: processing elements configurable: to process data according to a first dataflow; and to be grouped into first groups of the processing elements, each of the first groups including a first dependent processing element and a provider processing element, the first dependent processing element configured to depend on output from the provider processing element according to the first dataflow, wherein first dependent processing elements of the first groups of the processing elements are configured for testing in parallel.

2. The processor of clause 1, wherein: at least some of the processing elements are further configurable: to be grouped into second groups of the processing elements, each of the second groups including a second dependent processing element; and wherein second dependent processing elements of the second groups of the processing elements are configured for testing in parallel.

3. The processor of any one of clauses 1 or 2, wherein: each of the first groups is configured to accept test information and provide a test response, the test response indicating a status of the first dependent processing element.

4. The processor of any one of clauses 1 to 3, wherein: the first dependent processing element is configured to receive data inputs according to the first dataflow from the provider processing element.

5. The processor of any one of clauses 1 to 4, wherein: the first dependent processing elements are identical; or each of the first groups comprises identical processing elements.

6. The processor of any one of clauses 1 to 5, wherein: the processor is a many-core processor and the processing elements are cores of the core-based processor.

7. The processor of any one of clauses 1 to 6, wherein: the first dataflow organizes the processing elements into a two-dimensional data flow or a one-dimensional data flow.

8. A method for testing a processor comprising processing elements configurable to process data according to a first dataflow, comprising: providing test data to the processor, the test data comprising configuration information and test information, the configuration information groups the processing elements into first groups, each one of the first groups including a first dependent processing element and a provider processing element, the first dependent processing element configured to depend on output from the provider processing element according to the first dataflow, the test information at least partially determining a state of the each one of the first groups; and testing the first groups in parallel to determine statuses of the first dependent processing elements.

9. The method of clause 8, wherein the method further comprises: testing additional dependent processing elements by providing second test data to the processor, the second test data including the test information and second configuration information that changes the grouping of at least some of the processing elements; and testing the changed groups in parallel to determine statuses of the additional dependent processing elements.

10. The method of any one of clauses 8 or 9, wherein: the test information provides a degree of test coverage for the first dependent processing element and a lesser degree of test coverage for the provider processing element.

11. The method of any one of clauses 8 to 10, wherein: applying the test information to each of the first groups comprises providing the test information to a scan chain of a processing element in each of the first groups; and the method further comprises receiving test results from a scan chain of another processing element in each of the first groups.

12. The method of any one of clauses 8 to 11, wherein: the first dependent processing element is configured to receive data inputs according to the first dataflow from the provider processing element.

13. The method of any one of clauses 8 to 12, wherein: the first dependent processing elements are identical; or each of the first groups comprises identical processing elements.

14. The method of any one of clauses 8 to 13, wherein: the processor is a many-core processor and the processing elements are cores of the core-based processor.

15. The method of any one of clauses 8 to 14, wherein: the first dataflow organizes the processing elements into a two-dimensional data flow or a one-dimensional data flow.

16. A non-transitory computer-readable medium containing a set of instructions that are executable by a testing system to cause the testing system to perform operations for testing a processor including processing elements configurable to process data according to a first dataflow, the operations comprising: providing test data for testing first dependent processing, the test data including configuration instructions for grouping the processing elements into first groups, each of the first groups including a first dependent processing element and a provider processing element, the first dependent processing element configured to depend on output from the provider processing element according to the first dataflow, and test information for configuring the processing elements of the first groups; and testing the first groups to determine statuses of the first dependent processing elements.

17. The non-transitory computer-readable medium of clause 16, wherein: the testing provides a degree of test coverage for the first dependent processing element and a lesser degree of test coverage for the provider processing element.

18. The non-transitory computer-readable medium of any one of clauses 16 or 17, wherein: applying the test information to each of the first groups comprises providing the test information to a scan chain of a processing element in each of the first groups; and the method further comprises receiving test results from a scan chain of another processing element in each of the first groups.

19. The non-transitory computer-readable medium of any one of clauses 17 to 18, wherein: the first dependent processing element is configured to receive data inputs according to the first dataflow from the provider processing element.

20. The non-transitory computer-readable medium of any one of clauses 17 to 19, wherein: the first dependent processing elements are identical; or each of the first groups comprises identical processing elements.

21. The non-transitory computer-readable medium of any one of clauses 17 to 20, wherein: the processor is a many-core processor and the processing elements are cores of the core-based processor.

22. The non-transitory computer-readable medium of any one of clauses 17 to 21, wherein: the first dataflow organizes the processing elements into a two-dimensional data flow or a one-dimensional data flow.

23. A system including: a test system; and a chip communication system including processing elements configurable by the test system: to process data according to a first dataflow; and to be grouped into first groups of the processing elements, each of the first groups including a first dependent processing element and a provider processing element, the first dependent processing element configured to depend on output from the provider processing element according to the first dataflow, wherein first dependent processing elements of the first groups of the processing elements are configured for testing in parallel.

24. The device of clause 23, wherein: at least some of the processing elements are further configurable: to be grouped into second groups of the processing elements, each of the second groups including a second dependent processing element; and wherein second dependent processing elements of the second groups of the processing elements are configured for testing in parallel.

25. The device of any one of clauses 23 or 24, wherein: each of the first groups is configured to accept test information and provide a test response, the test response indicating a status of the first dependent processing element.

26. The device of any one of clauses 23 to 25, wherein: the first dependent processing element is configured to receive data inputs according to the first dataflow from the provider processing element.

27. The device of any one of clauses 23 to 26, wherein: the first dependent processing elements are identical; or each of the first groups comprises identical processing elements.

28. The device of any one of clauses 23 to 27, wherein: the processing elements are cores of a many-core processor.

29. The device of any one of clauses 23 to 28, wherein: the first dataflow organizes the processing elements into a two-dimensional data flow or a one-dimensional data flow.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A processor comprising:
multiplexors; and
processing elements configurable:
  to process data according to a first dataflow; and
  to be grouped into first groups of the processing elements using the multiplexors, each of the first groups including a first dependent processing element and a provider processing element, the first dependent processing element configured to depend on output from the provider processing element according to the first dataflow,
wherein first dependent processing elements of the first groups of the processing elements are configured for testing in parallel.

2. The processor of claim 1, wherein:
at least some of the processing elements are further configurable:
  to be grouped into second groups of the processing elements, each of the second groups including a second dependent processing element; and
wherein the second dependent processing elements of the second groups of the processing elements are configured for testing in parallel.

3. The processor of claim 1, wherein:
each of the first groups is configured to accept test information and provide a test response, the test response indicating a status of the first dependent processing element.

4. The processor of claim 1, wherein:
the first dependent processing element is configured to receive data inputs according to the first dataflow from the provider processing element.

5. The processor of claim 1, wherein:
the first dependent processing elements are identical; or
each of the first groups comprises identical processing elements.

6. The processor of claim 1, wherein:
the processor is a many-core processor and the processing elements are cores of the many-core processor.

7. The processor of claim 1, wherein:
the first dataflow organizes the processing elements into a two-dimensional data flow or a one-dimensional data flow.

8. A method for testing a processor comprising processing elements configurable to process data according to a first dataflow, comprising:

provide test data to the processor, the test data comprising configuration information and test information, the configuration information grouping the processing elements into first groups, each one of the first groups including a first dependent processing element and a provider processing element, the first dependent processing element configured to depend on output from the provider processing element according to the first dataflow, the test information at least partially determining a state of the each one of the first groups; and testing the first groups in parallel to determine statuses of the first dependent processing elements.

9. The method of claim 8, wherein the method further comprises:

testing additional dependent processing elements by providing second test data to the processor, the second test data including the test information and second configuration information that changes the grouping of at least some of the processing elements; and testing the changed groupings in parallel to determine statuses of the additional dependent processing elements.

10. The method of claim 8, wherein:
the test information provides a degree of test coverage for the first dependent processing element and a lesser degree of test coverage for the provider processing element.

11. The method of claim 8, wherein:
applying the test information to each of the first groups comprises providing the test information to a scan chain of a processing element in each of the first groups; and
the method further comprises receiving test results from a scan chain of another processing element in each of the first groups.

12. The method of claim 8, wherein:
the first dependent processing element is configured to receive data inputs according to the first dataflow from the provider processing element.

13. The method of claim 8, wherein:
the first dependent processing elements are identical; or each of the first groups comprises identical processing elements.

14. The method of claim 8, wherein:
the processor is a many-core processor and the processing elements are cores of the many-core processor.

15. The method of claim 8, wherein:
the first dataflow organizes the processing elements into a two-dimensional data flow or a one-dimensional data flow.

16. A non-transitory computer-readable medium containing a set of instructions that are executable by a testing system to cause the testing system to perform operations for testing a processor including processing elements configurable to process data according to a first dataflow, the operations comprising:

providing test data for testing first dependent processing elements, the test data including configuration instructions for grouping the processing elements into first groups, each of the first groups including one of the first dependent processing elements and a provider processing element, the one of the first dependent processing elements configured to depend on output from the provider processing element according to the first dataflow, and test information for configuring the processing elements of the first groups; and testing the first groups to determine statuses of the first dependent processing elements, wherein the testing provides a degree of test coverage for the first dependent processing element and a lesser degree of test coverage for the provider processing elements.

17. The non-transitory computer-readable medium of claim 16, wherein:

providing the test information for configuring the processing elements of the first groups comprises providing the test information to a scan chain of a one of the processing elements in each of the first groups; and the operations further comprise receiving test results from a scan chain of another one of the processing elements in each of the first groups.

18. The non-transitory computer-readable medium of claim 16, wherein:

the one of the first dependent processing elements is configured to receive data inputs according to the first dataflow from the provider processing element.

19. The non-transitory computer-readable medium of claim 16, wherein:

the first dependent processing elements are identical; or each of the first groups comprises identical processing elements.

20. The non-transitory computer-readable medium of claim 16, wherein:

the processor is a many-core processor and the processing elements are cores of the many-core processor.

21. The non-transitory computer-readable medium of claim 16, wherein:

the first dataflow organizes the processing elements into a two-dimensional data flow or a one-dimensional data flow.

22. A system including:
a test system; and
a processor including multiplexors and processing elements, the processor configurable by the test system:
to process data using the processing elements according to a first dataflow; and
to group the processing elements into first groups of the processing elements using the multiplexors, each of the first groups including a first dependent processing element and a provider processing element, the first dependent processing element configured to depend on output from the provider processing element according to the first dataflow,
wherein first dependent processing elements of the first groups of the processing elements are configured for testing in parallel.

23. The system of claim 22, wherein:
at least some of the processing elements are further configurable:
to be grouped into second groups of the processing elements, each of the second groups including a second dependent processing element; and
wherein second dependent processing elements of the second groups of the processing elements are configured for testing in parallel.

24. The system of claim 22, wherein:
each of the first groups is configured to accept test information and provide a test response, the test response indicating a status of the first dependent processing element.

25. The system of claim 22, wherein:
the first dependent processing element is configured to receive data inputs according to the first dataflow from the provider processing element.

26. The system of claim 22, wherein:
the first dependent processing elements are identical; or
each of the first groups comprises identical processing elements.

27. The system of claim 22, wherein:
the processor is a many-core processor and the processing elements are cores of the many-core processor.

28. The system of claim 22, wherein:
the first dataflow organizes the processing elements into a two-dimensional data flow or a one-dimensional data flow.

* * * * *